United States Patent [19]
Jordan et al.

[11] Patent Number: 5,260,860
[45] Date of Patent: Nov. 9, 1993

[54] EXPANDING TENON CLAMP

[75] Inventors: David L. Jordan, Boones Mill; Dwight D. Boyd, Radford, both of Va.

[73] Assignee: Hubbell Incorporated, Orange, Conn.

[21] Appl. No.: 855,910

[22] Filed: Mar. 23, 1992

[51] Int. Cl.$^5$ ............................................. F21V 21/10
[52] U.S. Cl. ................................... 362/431; 362/396
[58] Field of Search ............... 362/431, 396, 382, 432; 248/219.2

[56] References Cited

U.S. PATENT DOCUMENTS

| | | | |
|---|---|---|---|
| 1,283,480 | 11/1918 | Duffy . | |
| 1,301,994 | 4/1919 | Archer et al. . | |
| 1,389,013 | 8/1921 | Schwartz . | |
| 2,107,906 | 2/1938 | Rogers | 240/41 |
| 2,967,230 | 1/1961 | Goetz et al. | 240/3 |
| 3,246,135 | 4/1966 | Husby | 240/3 |
| 3,519,811 | 7/1970 | Jacobs | 240/3 |
| 3,794,826 | 2/1974 | Jablonski | 362/431 |
| 4,064,432 | 12/1977 | Compton et al. | 362/431 |
| 4,074,941 | 2/1978 | Jablonski | 362/431 |
| 4,349,865 | 9/1982 | Terrel | 362/250 |
| 4,380,792 | 4/1983 | Terrell | 362/250 |
| 4,517,632 | 5/1985 | Roos | 362/389 |
| 4,546,944 | 10/1985 | Cea | 362/431 |
| 4,639,843 | 1/1987 | Compton | 362/431 |
| 4,722,502 | 2/1988 | Mueller et al. | 248/284 |
| 4,782,435 | 11/1988 | Manzoni | 362/427 |
| 4,785,190 | 11/1988 | Frankena | 250/503.1 |
| 4,811,923 | 3/1989 | Haberthür | 248/278 |

FOREIGN PATENT DOCUMENTS 2618564 11/1977 Fed. Rep. of Germany .

Primary Examiner—Richard R. Cole
Attorney, Agent, or Firm—Jerry M. Presson; Mark S. Bicks; Alfred N. Goodman

[57] ABSTRACT

A clamp mechanism secures a lighting fixture to a mounting apparatus. A tenon is inserted into the open end of a mounting pole. A radially expandable element, mounted on the tenon, is adjusted to expand radially outwardly to engage the inner surface of the mounting pole. Radial outward expansion of the expandable element is imparted by a threaded bolt which threadedly engages a base of the expandable element. As the base is drawn towards the end face of the tenon, angled legs of the expandable element are cammed outwardly until distal ends of the legs frictionally engage the inner surface of the mounting pole.

24 Claims, 4 Drawing Sheets

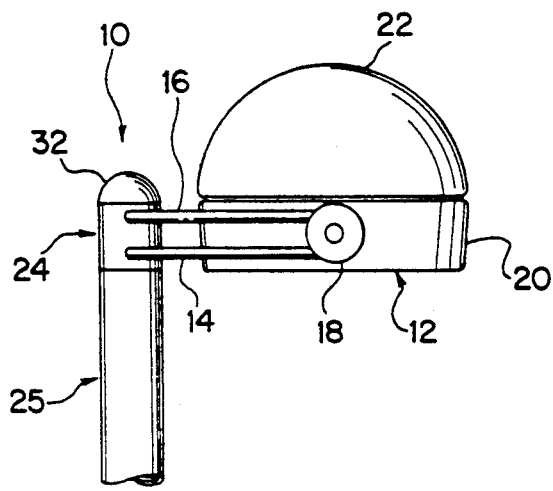
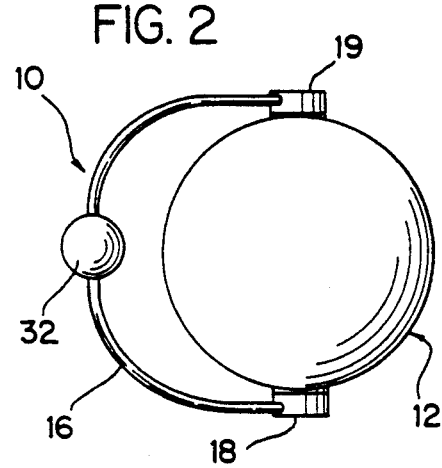
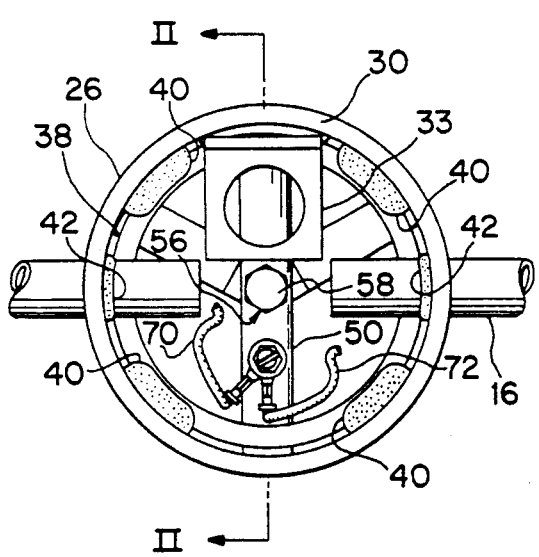
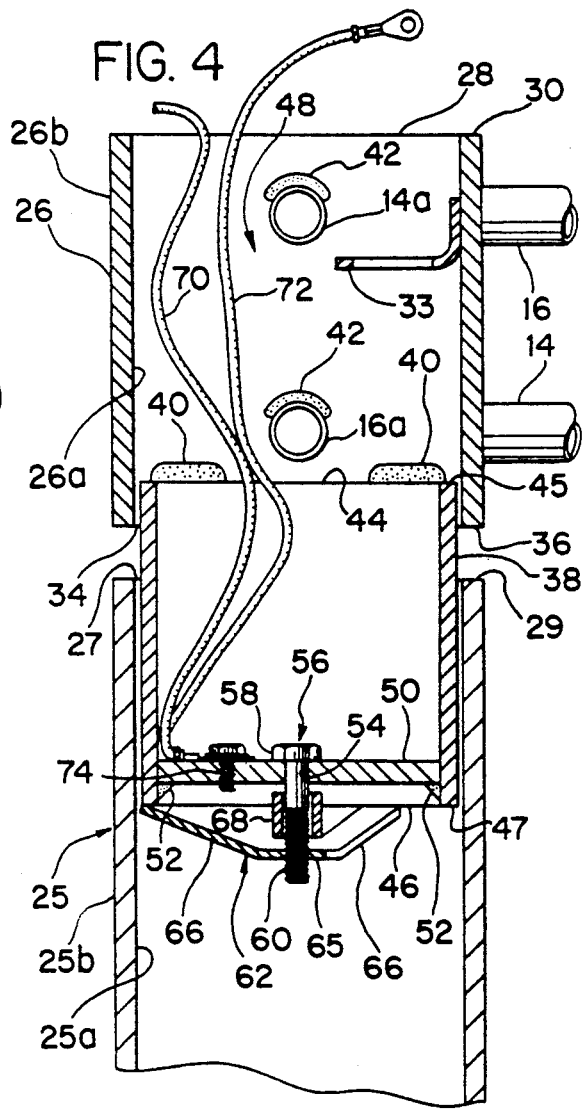
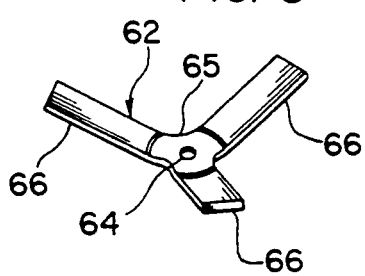

EXPANDING TENON CLAMP

BACKGROUND OF THE INVENTION

Rotatable lamps are typically supported by cantilevered spokes or support arms, often by a pair of opposed cantilevered arms. Proximal ends of the cantilevered arms are connected to a tenon fitter, while the distal ends are connected to casings provided on diametrically opposite sides of the housing of the lighting fixture. The casings permit pivotal movement of the housing between the arms, without damaging fixture wiring that passes internally through the arms. This type of mounting structure is described in U.S. patent application Ser. No. 07/725,485, filed Jul. 3, 1991 by Edgell et al., now U.S. Pat. No. 5,183,331, entitled CANTILEVERED SPOKE MOUNTING FOR LIGHTING FIXTURE, the subject matter of which is incorporated herein by reference.

The tenon fitted is typically a sleeve, to which the proximal ends of the cantilevered arms are connected. A tenon extends axially from the proximal end of the sleeve and is received in an open end of a mounting pole. Typically, the mounting pole has an outer diameter or dimension the same as that of the sleeve. The inner diameter of the mounting pole is slightly larger than the outer diameter of the tenon, which tenon is received in the open end of the mounting pole. When assembled, the axial end face of the mounting pole abuts the proximal end face of the sleeve.

Set screws have been used to secure the sleeve to the mounting pole. Tapped bores are provided circumferentially around the mounting pole near the upper end thereof. A set screw threadedly engages corresponding tapped bores such that end faces of the set screws extend inwardly to engage the outer surface of the tenon. The frictional engagement of the set screw end faces interlocks the tenon fitter with the mounting pole.

While set screws are for the most part adequate for securing the tenon fitter to the mounting pole, they tend to detract from the architecturally pleasing external appearance of the mounting system associated with the lighting fixture and to deteriorate from exposure to the environment. Moreover, a set screw applies a securing force at a specific point and thus may not provide a sufficient hold. Also, a single set screw may cause the tenon fitter and mounting pole to become eccentric so that the outer surfaces of the tenon fitter sleeve and mounting pole are misaligned. This misalignment will detract from the appearance of the structure. If more than one set screw is required to ensure proper alignment, the process of securing the tenon fitter becomes more time consuming and the problem of degrading the external appearance of the structure is exacerbated.

Examples of other types of housing mounting systems are disclosed in U.S. Pat. Nos. 1,389,013 to Schwartz; 3,246,135 to Husby; 3,519,811 to Jacobs; 1,283,480 to Duffy; and 4,722,502 to Mueller et al.

SUMMARY OF THE INVENTION

Accordingly, an object of the present invention is to provide a tenon clamp which is not visible from outside and is not exposed to the environment.

Another object of the present invention is to provide a light fixture coupler that is easy to operate using simple tools.

A further object of the present invention is to provide a clamp located internally of two members to be coupled, while being adjusted from outside the two members.

The foregoing objects are basically attained by a mounting apparatus for a light fixture having a support for carrying the light fixture, and a coupler including a sleeve connected to the support member. The sleeve has an open, first end, an opposite second end, and an outer surface. A tenon extends axially from the second end of the sleeve, and has an outer surface, a distal end and a distal end face. The tenon is received in an open end of a mounting pole. A clamp mounted on the tenon is selectively adjustable to move radially into and out of frictional engagement with the inner surface of the mounting pole.

The clamp can include a radially expandable element having at least one leg. In one embodiment, the surfaces of the tenon, mounting pole and sleeve are cylindrical, and the expandable element has three legs formed integrally with a base. The legs can be angled with respect to the base and can slidably engage the end face of the tenon. A threaded bolt can be received in a threaded bore provided in the base and rotated to adjust the expandable element. As the bolt is tightened, the distal ends of the legs extend further outwardly until they frictionally engage the inner surface of the mounting pole.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure:

FIG. 1 is a side elevational view of a lighting fixture and mounting apparatus according to a first embodiment of the present invention;

FIG. 2 is a top view of the light fixture and mounting apparatus of FIG. 1;

FIG. 3 is an enlarged, partial, top view of the tenon fitter component of the mounting apparatus of FIG. 1, with the thematic cap removed to illustrate the interior thereof;

FIG. 4 is a side elevational view in section along line II—II of FIG. 3, and showing the tenon fitter unclamped and partially received in the mounting pole;

FIG. 6 is a perspective view of a radially expandable element of a clamp according to the first embodiment of the present invention;

DETAILED DESCRIPTION OF THE INVENTION

Figure 5:
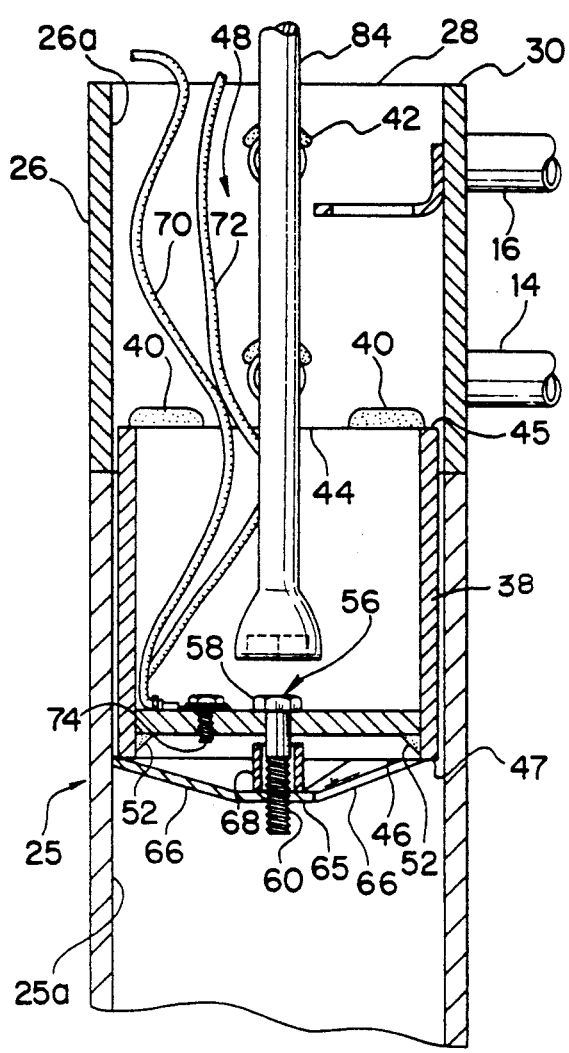
FIG. 5 is a side elevational view in section, similar to FIG. 4 except with the tenon fitter in a fully inserted and clamped position.
Figure 7:
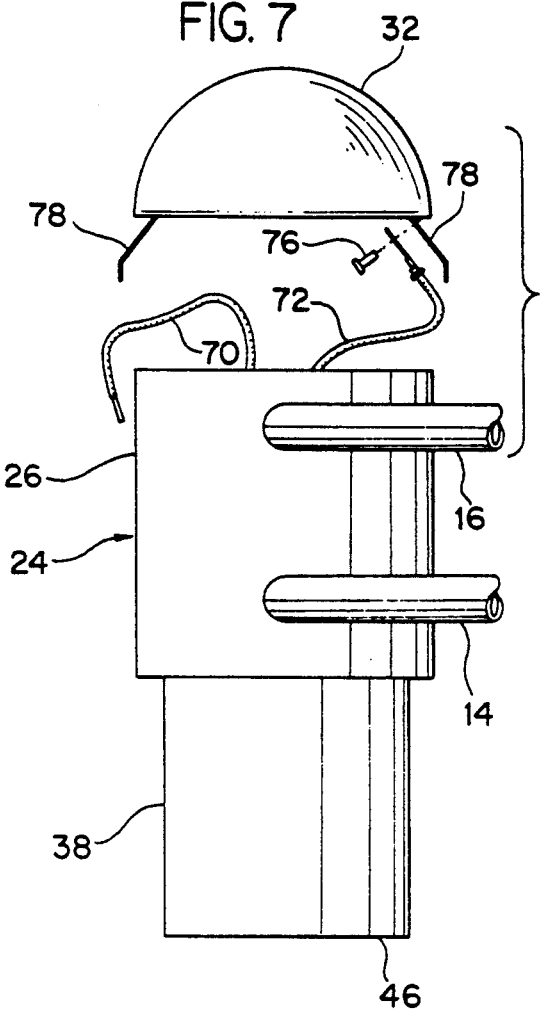
FIG. 7 is a side elevational view of the tenon fitter, separated from the mounting pole of the mounting apparatus.

Referring initially to FIGS. 1-7, a mounting apparatus 10 for a lighting fixture 12 is illustrated in accordance with the present invention and includes a pair of identical support arms 14 and 16 which carry the lighting fixture 12. Distal ends of the support arms 14 and 16 are received in ear muffs or casings 18 and 19 disposed on diametrically opposite sides of a fixture housing 20. Fixture housing 20 is annularly shaped and supports a cover 22.

A coupler or tenon fitter 24 is mounted on a mounting pole 25 having an inner surface 25a, an outer surface 25b, an open end 27 and an end face 29. Tenon fitter 24 includes a cylindrical sleeve 26 having a first open end 28 defining an end face 30, an inner surface 26a and an outer surface 26b. A thematic cap 32 covers the open end 28 and prevents water or other foreign matter from entering tenon fitter 24. An open opposite end 34 of sleeve 26 defines a second end face 36. A tenon 38 is fixedly connected to sleeve 26 by circumferentially spaced welds 40, and extends coaxially from the open end 34. End portions 14a and 16a of support arms 14 and 16 are received in holes formed in the sleeve 26 and are fixedly connected thereto by welds 42.

Tenon 38 has an open proximal end 44 and an open distal end 46, each end defining an end face 45 and 47, respectively. Welds 40 are preferably formed on the end face 45. Sleeve 26 and tenon 38 define a continuous interior passageway 48 extending axially from the open end 28 of sleeve 26 to the open distal end 46 of tenon 38. Adjacent end 46, a transverse plate or cross bar 50 extends diametrically across the interior of tenon 38 and is connected to the inner surface of tenon 38 by welds 52. A central bore 54 extends longitudinally through the cross bar 50 and rotatably mounts a threaded bolt 56. A head 58 of the bolt 56 bears against the inner surface of cross bar 50, while a threaded shaft portion 60 extends axially beyond the end face 47 of tenon 38.

A radially expandable element 62 has a central threaded bore 64 formed in a base 65. Three radially outwardly projecting flexible legs 66 have proximal ends integral with the base 65 and distal ends which extend radially outwardly approximately to the cylindrical outer surface of the side wall of tenon 38 when the element 62 is in the disengaged position of FIG. 4. The three legs 66 are equally spaced around the circumference of the base 65, or at about 120° intervals, and angled with respect to the plane of base 65. The angle between the plane of base 65 and each leg 66 is preferably about 20°.

The threaded bore 64 threadedly engages the threaded shaft portion 60 of the bolt 56. Rotational movement of the bolt 56 is converted into axial translatory movement of the base 65 of element 62. Slight frictional engagement of the legs 66 on the end face 47 of tenon 38 restrains element 62 from rotating with the bolt 56. As the base 65 is drawn axially towards the end face 47, the arms 66, slidably bearing against the end face 47, are forced radially outwardly until distal ends of the legs 66 frictionally engage the cylindrical inner surface 25a of the mounting pole 25.

Element 62 is made of resilient metal or other suitable material so that the arms 66 flex and become less acutely angled with respect to the base 65 as the bolt is tightened. A spring force is developed that returns the legs 66 to their original disposition after the bolt is loosened. Over tightening of the bolt 56 could lead to permanent deformation of element 62. Therefore, a spacer 68 is placed on the bolt to limit the extent of inward movement of the base 65. The limit for tightening bolt 56 is reached when one end of the spacer 68 abuts the outer surface of cross bar 50 and the opposite end abuts the base 65.

Ground wires 70 and 72 are connected at one end to the cross bar 50 by a screw 74. The upper end of wire 72 is provided with an end fitting and connected by a rivet 76 to one of two spring arms 78 of cap 32 (FIG. 6). Spring arms 78 hold the cap 32 on the end face 30 of the sleeve 26. Wire 70 is connectable to other wiring (not shown) of the lighting fixture 12 which passes through the hollow interior of the tubular support arms 14 and 16.

ASSEMBLY AND OPERATION

Tenon fitter 24 is detachably coupled to the mounting pole 25 by manipulation of the expandable element 62. Tenon 38 is first inserted into the open end 27 of the mounting pole 25 and slid inwardly until the end face 36 of sleeve 26 abuts the end face 29 of the mounting pole 25. Sleeve 26 and mounting pole 25 have the same outer diameter such that the outer surface 26b of sleeve 26 is a continuum of the outer surface 25b of the mounting pole 25. The outer surface of tenon 38 has a diameter slightly less than the diameter of the inner surface of the mounting pole 25.

When tenon 38 is first received in the mounting pole 25, the expandable element 62 is in a first, inoperative position as shown in FIG. 4. As shown in FIG. 5, to secure the position of the tenon fitter 24, bolt 56 is rotated by a socket tool 84 or other suitable instrument inserted through the open end 28 of sleeve 26. As the bolt is rotated, the legs 66 expand radially outwardly to engage the inner surface 25a of the mounting pole 25. Over tightening of the bolt 56, which might otherwise cause permanent deformation of the expandable element, is prevented by spacer 68.

After tightening the bolt 56, appropriate wiring connections are made and the cap 32 is fitted on the open end 28 of sleeve 26. A bracket 33 may be used to support the wiring. Spring arms 78 of the cap 32 engage the inner surface 26a of sleeve 26. In the assembled condition, a clean, architecturally pleasing outer appearance is achieved, with no visible sign of the clamping mechanism. Additionally, the clamping mechanism is protected from the environment.

Since sleeve 26 is relatively short compared to mounting pole 25, it is preferable to orient the head 58 of bolt 56 towards the open end 28 of sleeve 26 and insert the tool 84 through the open end 28. Thus, the support arms 14 and 16 should support the lighting fixture 12 in a position removed from the open end 28 of sleeve 26 to permit ingress and egress of the tool 84.

THE EMBODIMENT OF FIGS. 8 AND 9

Figure 8:
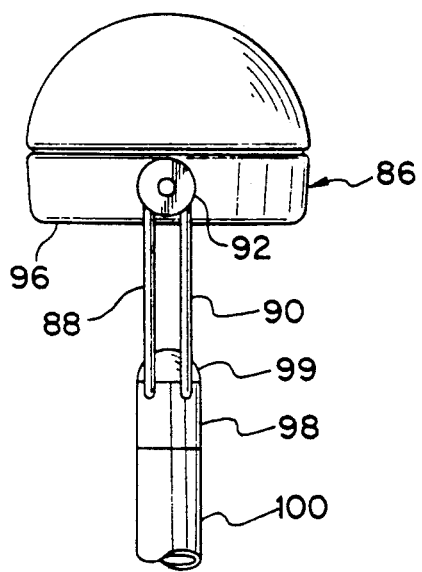
FIG. 8 is a side elevational view of another embodiment of a mounting apparatus according to the present invention in which the support arm extends upwardly from the tenon fitter.
Figure 9:
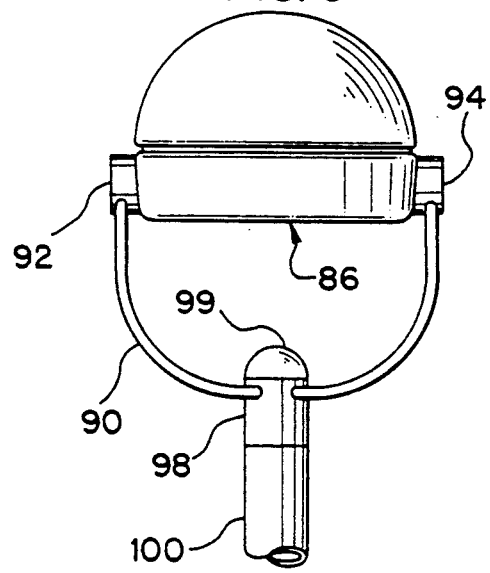
FIG. 9 is a front elevational view of the embodiment of FIG. 8.

Alternative arrangements of support arms may be employed such that the lighting fixture can assume different orientations. In the embodiment of FIGS. 8 and 9, the lighting fixture 86 is carried by generally vertically oriented support arms 88 and 90. Support arms 88 and 90 are similar to support arms 14 and 16 in that distal ends are received in casings 92 and 94 secured to diametrically opposite sides of a fixture housing 96. Casings 92 and 94 permit pivotal movement of the light fixture 86 between the support arms 88 and 90.

Proximal ends of the support arms 88 and 90 are received in a tenon fitter 98 having the same construction as tenon fitter 24. The same clamp mechanism as employed in the previous embodiment secures the tenon fitter 98 to a mounting pole 100. The clamp mechanism is accessed by removing a cap 99.

THE EMBODIMENT OF FIGS. 10 AND 11

Figure 10:
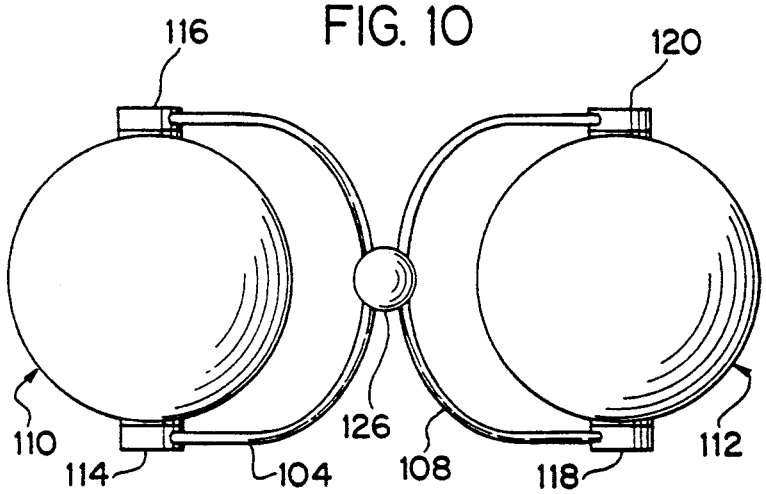
FIG. 10 is a top view of another embodiment of a mounting apparatus according to the present invention in which the support arms support two light fixtures, perpendicularly with respect to the mounting pole.
Figure 11:
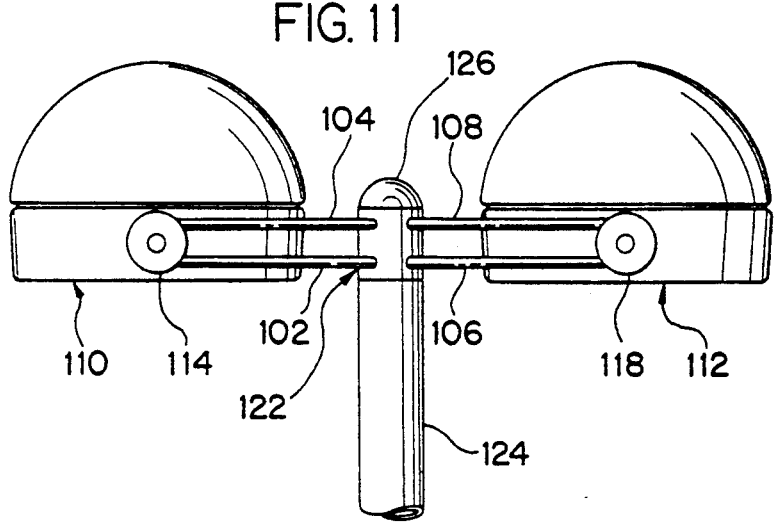
FIG. 11 is a side elevational view of the embodiment of FIG. 9.

The embodiment of FIGS. 10 and 11 employs a double pair of support arms 102, 104 and 106, 108. Arms 102 and 104 carry a lighting fixture 110, while arms 106 and 108 carry a second lighting fixture 112. Casings 114 and 116 receive distal ends of the support arms 102 and 104 and permit pivotal movement of the lighting fixture 110 between the arms. Casings 118 and 120 receive distal ends of support arms 106 and 108 and permit pivot movement of the lighting fixture 112 between the support arms. Proximal ends of the support arms are received in and fixedly connected to a tenon fitter 122.

Tenon fitter 122 is essentially the same as tenon fitter 24 of the first embodiment and has the same clamp mechanism for securing the tenon fitter 122 to a mounting pole 124. The clamp mechanism is accessed by removing a cap 126.

THE EMBODIMENT OF FIGS 12-14

Figure 12:
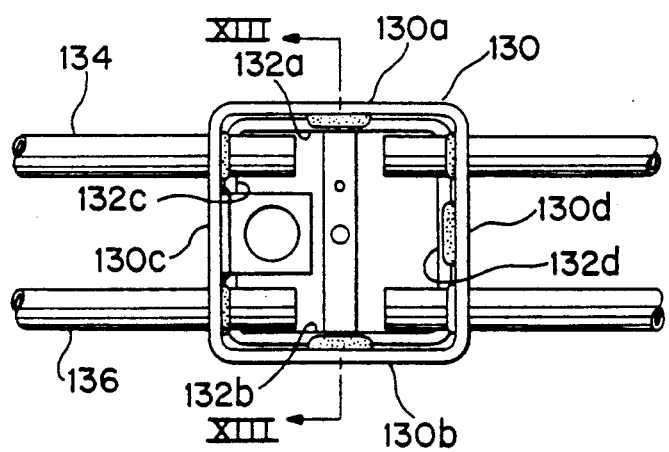
FIG. 12 is a partial top view of a second embodiment of a mounting apparatus according to the present invention, illustrating a box-beam tenon fitter.
Figure 13:
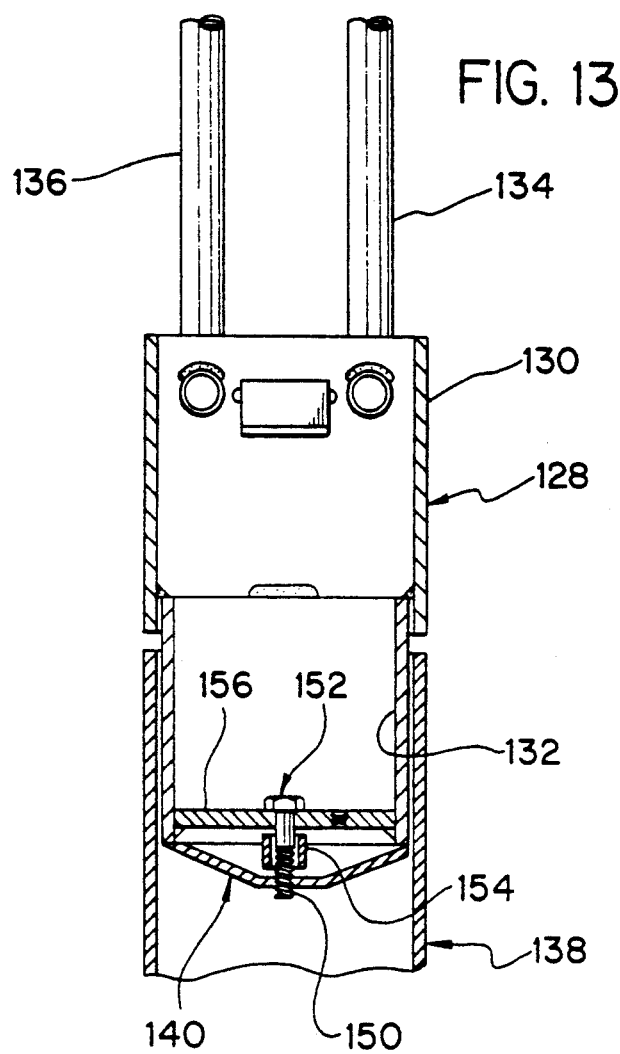
FIG. 13 is a partial side elevational view in section along line XIII—XIII of FIG. 12.
Figure 14:
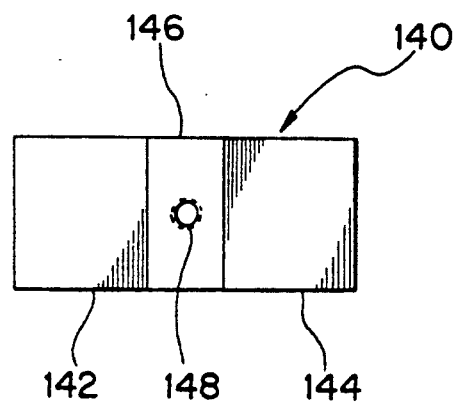
FIG. 14 is a top view of the radially expandable element of the clamp used in the second embodiment of FIG. 12.

In the previous embodiments, the mounting pole is a right circular cylinder, and the tenon fitter has sleeve and tenon components which are correspondingly right circular cylinders. Other cross-sectional shapes may be employed, however. In the embodiment of FIGS. 12-14, for example, a tenon fitter 128 has a sleeve 130 and a tenon 132 having rectangular transverse cross-sectional shapes. Tenon fitter 128 is similar in construction to the tenon fitters of the previous embodiments, except in its shape. Instead of having circular cylindrical side walls, sleeve 130 has parallel, planar side walls 130a, 130b and parallel, planar side walls 130c, 130d. Support arms 134 and 136 are received in and fixedly connected to side walls 130c and 130d and extend upwardly as in the embodiment of FIGS. 8 and 9.

Tenon 132 has parallel, planar side walls 132a, 132b and parallel, planar side walls 132c, 132d. A mounting pole 138 is dimensioned the same as sleeve 130. Thus, when assembled, sleeve 130 is a continuum of mounting pole 138. Outer surfaces of sleeve 130 are flush with outer surfaces of mounting pole 138.

The clamping element of the embodiment of FIGS. 12-14 is conceptually similar the previously-described clamping element. However, since the inner surfaces of mounting pole 138 are flat, a different expandable element 140 is employed.

Element 140 is overall rectangularly shaped and includes two legs 142 and 144 integrally formed at opposite sides of a base 146. Legs 142 and 144 are angled with respect to the plane of base 146, preferably at about 20°. The base 146 has a threaded bore 148 which threadedly engages a threaded shaft portion 150 of a headed bolt 152. A spacer 154 is provided between an outer surface of a cross bar 156 and an inner surface of element 140 to prevent over tightening. As the bolt is tightened, arms 142 and 144 are cammed radially outwardly to engage the inner surface of mounting pole 138.

Various other shapes of tenon fitters and mounting poles may be employed so long as a smooth, clean and continuous exterior surface is achieved. Also, an adequate grip must be maintained by the clamping mechanism on the inner surface of the mounting pole. Moreover, other and different types of support arms and lightening fixtures can be employed in combination with the clamp mechanism described herein.

While various embodiments have been chosen to illustrate the invention, it will be understood by those skilled in the art that various changes and modifications can be made therein without departing from the scope of the invention as defined in the appended claims.

What is claimed is:

1. A coupler for mounting a lighting fixture on a mounting pole having an open end, an outer surface and an inner surface, comprising:

a sleeve having an inner surface and an outer surface;

means for connecting the lighting fixture to said sleeve;

a tenon connected coaxially to said sleeve and having a distal end face, an inner surface and an outer surface, said tenon being received in the open end of the mounting pole;

clamp means, mounted on said tenon, for selectively engaging the inner surface of the mounting pole and clamping said tenon to the mounting pole, said clamp means including a radially expandable element adjustable mounted on said tenon to move between a first, inoperative position and a second, operative position axially spaced from said first position and including driving means for moving said expandable element; and limit means, disposed between said expandable element and said tenon, for preventing axial movement of said expandable element beyond the second, operation position.

2. A coupler according to claim 1, wherein said expandable element has a base and at least one flexible leg angled with respect to said distal end face of said tenon, said leg having a distal end and being slidable over said distal end face of said tenon; and said distal end of said leg extends radially outwardly approximately to said outer surface of said tenon when the expandable element is in the first, inoperative position, and extends radially outwardly beyond said outer surface of said tenon to impinge against the inner surface of the mounting pole when said expandable element is in the second, operative position.

3. A coupler according to claim 2, wherein said base of the expandable element has a threaded bore; and said driving means includes a threaded bolt rotatably mounted in said tenon and threadedly engaging said threaded bore in said base.

4. A coupler according to claim 3, wherein said clamp means includes a transverse plate mounted in said tenon and having a bore for receiving said threaded bolt.

5. A coupler according to claim 4, wherein said limit means is disposed between said transverse plate and said base.

6. A coupler according to claim 5, wherein said limit means comprises a spacer slidably mounted on said threaded bolt between said base of said expandable element and said transverse plate.

7. A coupler according to claim 2, wherein said inner and outer surfaces of said tenon are cylindrical; and
said expandable element includes three flexible legs, spaced circumferentially around and angled with respect to said base.

8. A coupler according to claim 2, wherein the inner and outer surfaces of said tenon are rectangular; and
said expandable element includes two flexible legs extending radially outwardly from opposite sides of said base, at acute angles, with respect to the base.

9. A coupler according to claim 1 wherein said driving means comprises a movable bolt; and
said limit means comprises a spacer mounted about said bolt.

10. A light, comprising:
a support carrying a light fixture;
a coupler including a sleeve connected to said support, said sleeve having an open first end, an opposite, open second end, an outer surface and an inner surface, and a tenon connected to and extending axially from said second end of said sleeve, said tenon having an inner surface, an outer surface, an open proximal end, and a distal end face, said tenon and said sleeve defining an interior passageway extending from said open first end of said sleeve to said distal end of said tenon;
a mounting pole having an open end and an inner surface, said tenon being received coaxially in said open end of said mounting pole;
a clamp adjustably mounted on said tenon to move radially into and out of frictional engagement with said inner surface of said mounting pole, said clamp including a cross bar having a bore and being fixedly connected to said inner surface of said tenon, an expandable element having at least one leg extending outwardly from a base with a threaded bore, and a bolt threadedly engaging said threaded bore in said base and being rotatably mounted in said bore of said cross bar, said leg being angled with respect to said base and slidably engaging said distal end face of said tenon to cam said leg radially outwardly as the bolt is tightened; and
a limit spacer, slidably mounted about said bolt and disposed between said expandable element and said tenon, for preventing overtightening of said bolt.

11. A light according to claim 10, wherein said expandable element has three legs spaced at equal intervals around said base; and
wherein said inner and outer surfaces of said mounting pole, sleeve and tenon are cylindrical, said outer surfaces of said mounting pole and sleeve having the same diameter.

12. A mounting apparatus for a lighting fixture, comprising:
a support having a proximal end and a distal end;
means for connecting the lighting fixture to the distal end of said support;
a coupler including a sleeve having an inner surface and an outer surface, and a tenon having a distal end face, an inner surface and an outer surface, said proximal end of said support arm being connected to said sleeve;
a mounting pole having an open end, an inner surface and an outer surface, said tenon of said coupler being received in the open end of said mounting pole;
clamp means, mounted on said tenon of said coupler, for selectively and releasably engaging said inner surface of said mounting pole, and thereby clamping said coupler to said mounting pole, said clamp means including a radially expandable element adjustable mounted on said tenon for movement between a first, inoperative position and a second, operative position axially spaced from said first position and including driving means for moving said expandable element axially; and
limit means, disposed between said expandable element and said tenon, for preventing axial movement of said expandable element beyond the second, operative position.

13. A mounting apparatus according to claim 12, wherein said expandable element comprises a base and at least one flexible leg angled with respect to said distal end face of said tenon, said leg having a distal end and being slidable over said distal end face of said tenon; and
said distal end of said leg extends radially outwardly approximately to said outer surface of said tenon, but radially spaced from said inner surface of said mounting pole, when said expandable element is in the first, inoperative position, and extends radially outwardly to engage said inner surface of said mounting pole when said expandable element is in the second, operative position.

14. A mounting apparatus according to claim 13, wherein said base of said expandable element comprises a threaded bore; and
said driving means includes a threaded bolt rotatably mounted in said tenon of said coupler and threadedly engaging said threaded bore in said base.

15. A mounting apparatus according to claim 14, wherein said clamp means includes a transverse plate mounted in said tenon and having bore for receiving said threaded bolt.

16. A mounting apparatus according to claim 15, wherein said limit means are disposed between said transverse plate and said base.

17. A mounting apparatus according to claim 16, wherein said limit means comprises a spacer slidably mounted on said threaded bolt between said base of said expandable element and said transverse plate.

18. A mounting apparatus according to claim 13, wherein said inner and outer surfaces of said mounting pole, and said outer surfaces of said sleeve and tenon of said coupler are cylindrical; and
said expandable element includes three flexible legs, spaced circumferentially around and angled with respect to said base.

19. A mounting apparatus according to claim 18, wherein said three legs are angled at about 20° with respect to said base.

20. A mounting apparatus according to claim 13, wherein said inner and outer surfaces of said mounting pole and said outer surfaces of said sleeve and tenon of said coupler are rectangular; and
said expandable element includes two flexible legs extending radially outwardly from opposite sides of said base and at acute angles with respect to said base.

21. A mounting apparatus according to claim 12, wherein said support comprises two support arms oriented perpendicularly with respect to said mounting pole.

22. A mounting apparatus according to claim 12, wherein said support comprises two pairs of support arms oriented perpendicularly with respect to said mounting pole and extending in opposite directions with respect to each other.

23. A mounting apparatus according to claim 12, wherein said support comprises two support arms extending in the direction of the mounting pole.

24. A mounting apparatus according to claim 12 wherein said driving means comprises a movable bolt; and said limit means comprises a spacer mounted about said bolt.

* * * * *